United States Patent [19]

Roast et al.

[11] 4,260,357

[45] Apr. 7, 1981

[54] STRIPPER RING FOR CAPSULE PINS

[75] Inventors: William G. Roast; Geoffrey E. Adnams, both of Basingstoke, England

[73] Assignee: Lilly Industries Limited, London, England

[21] Appl. No.: 121,761

[22] Filed: Feb. 15, 1980

[51] Int. Cl.³ .......................... B29C 1/00; B29D 23/00
[52] U.S. Cl. ...................................... 425/472; 29/229; 29/270; 425/274; 425/438; 425/537; 425/556; 425/804
[58] Field of Search ................ 425/438, 93, 274, 537, 425/804, 556, 472; 29/229, 270

[56] References Cited

U.S. PATENT DOCUMENTS

| 2,671,245 | 3/1954 | Kath | 29/38.9 |
| 2,760,258 | 8/1956 | Rieger | 29/229 |
| 2,915,327 | 12/1959 | Kreske | 403/104 |
| 3,264,684 | 8/1966 | Moslo | 425/525 |
| 3,817,678 | 6/1974 | Armour | 425/525 |
| 3,929,960 | 12/1975 | Findlay et al. | 264/292 |
| 4,153,406 | 5/1979 | Dittman et al. | 425/438 |

Primary Examiner—W. E. Hoag
Attorney, Agent, or Firm—Houston H. Swenson; Arthur R. Whale

[57] ABSTRACT

This invention relates to a ring form of a rigid and durable material with a metal insert arranged in its passageway. The ring is employed to strip thin walled gelatin capsules from capsule-forming pins which are slightly tapered along their entire length.

5 Claims, 3 Drawing Figures

STRIPPER RING FOR CAPSULE PINS

BACKGROUND OF THE INVENTION

The production of pharmaceutical capsules has primarily depended on the use of metal pins which are dipped into molten gelatin material. These pins may be formed from stainless steel and are slightly tapered along their entire length to enable the capsule body or cap to be stripped from the pin after the gelatin has firmly set. U.S. Pat. No. 2,671,245, assigned to Eli Lilly and Company, discloses apparatus which includes the use of stripping jaws for stripping capsule sections from pins. The pins with the formed gelatin film are encircled by the stripping jaws which are then actuated to clamp onto the pin so that subsequent lateral motion will strip off the formed gelatin film. Such a system has been very effective in removing capsule sections from pins but is subject to substantial wear. This necessitates the shutting down of the capsule forming machines and replacing parts of the stripping tools.

SUMMARY OF THE INVENTION

The invention described herein relates to a stripper ring which encircles a capsule forming pin and is normally positioned at the upper end of the capsule pin. This ring may be formed of a plastic material and uses a metal insert in a portion of its bore for gripping the capsule section and moving it off of the pin. Because the pin is tapered it is essential that the inner diameter of the stripper ring is variable as it is moved to eject a capsule section from the pin. Thus, the ring may be split to enable it to assume a slightly biased state throughout its travel along the length of the pin. This biased state can be further enhanced by the provision of a spring clamp about its exterior.

DESCRIPTION OF THE INVENTION

Figure 1:
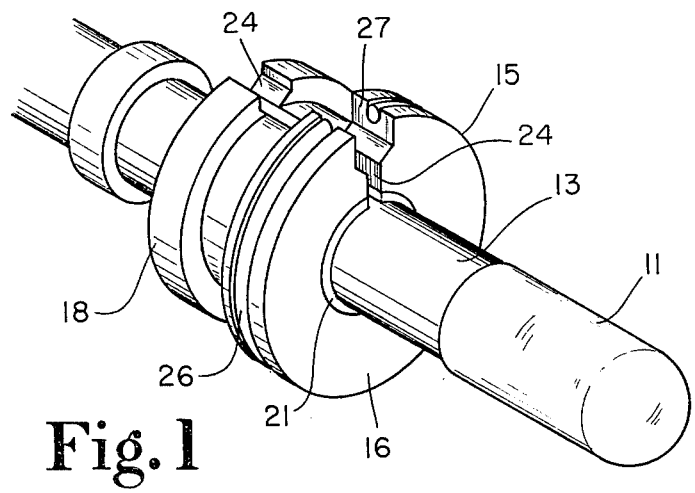
FIG. 1 shows a stripper ring on a capsule forming pin with a capsule section about to be stripped.
Figure 3:
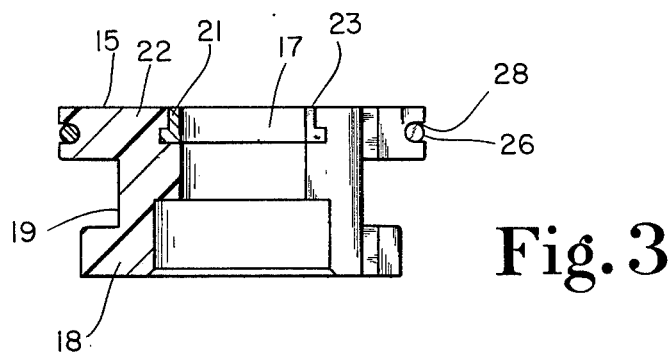
FIG. 3 is a view in cross section along line 3—3 of FIG. 2.
Figure 2:
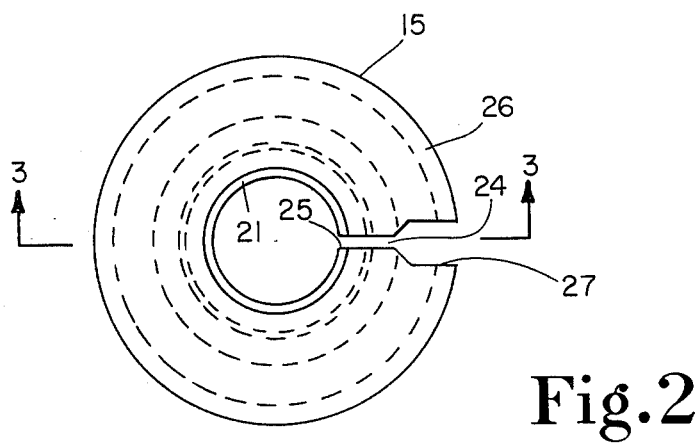
FIG. 2 is a top plan view of the stripper ring.

Referring to FIG. 1, a pharmaceutical capsule section 11, which may be either a capsule cap or capsule body is shown on the end of a capsule forming pin 13. This capsule section has been formed a sufficient amount of time to allow its gelatin to set and is ready for stripping from the pin. Stripper ring 15 is shown in a partially extended position and has a bore 17 tightly encircling pin 13. As shown in FIGS. 2 and 3, ring 15 has a leading shoulder 16 and a trailing shoulder 18 which define a circumferential groove 19 there between. This groove provides a gripping area for an actuating mechanism, not a part of this invention, which is used to move stripper ring 15 along the length of pin 13.

Ring 15 may be molded from a rigid and durable plastic material such as polyacetal or nylon. An annular insert 21 of a durable hard material is positioned at the leading face 22 of shoulder 16. This insert may be of a metal substance and a preferred one is phosphorus bronze. Thus, its exposed front edge is able to retain the sharpness needed for repeatedly stripping the thin walled capsule sections. The ring may be force-fitted into its illustrated position in ring 15 or it may be formed into the ring during the molding process used for the ring.

Pin 13 has a slight taper which decreases whereby the end supporting the capsule section is of the smallest diameter. It is imperative that ring 15 tightly grips the pin throughout its contact along the length of the pin. If the ring is of a dimension whereby it grips the upper portion of the pin and is not capable of reducing its diameter in accordance with the pin taper, it will fail to properly strip the formed capsule section from the pin. Ring 15 is normally retracted and positioned at the uppermost point of the pin, causing it to assume its largest diameter. The nature of plastics is such that maintaining the ring in its largest position will cause the material to tend to set into a diameter that is greater than the one required for stripping the capsule section at the lowermost point of the pin. This unwanted relaxation is likewise true with respect to the changing diameter of the metal insert 21.

This problem has been substantially eliminated through the use of a slot 24 which extends through the length of the ring and from its outer perimeter to the ring's bore. Likewise, insert 21 has been provided with a slot 25 which is in alignment with slot 24 of the ring. The provision of this slot enables the ring, which is normally in a stressed gripping condition, to tend to adopt a lesser stressed condition as it rides along the length of the pin. Slot 24 may be formed with a larger cut-out 27 at its exterior portion to assist in the molding technique for the ring. In order to further facilitate the ability of the ring to assume a decreasing inner diameter as it travels along the pin's length, a biased spring slip 26 is provided in a groove 28 on leading shoulder 16. In this manner, ring 15 will be constantly urged toward a smaller diameter as it moves along pin 13 to strip capsule section 11. The use of insert 21 significantly adds to the life of the ring without adversely effecting the ability of the ring to assume a smaller diameter. In fact, the ring insert cooperates with the spring clip 26 to maintain the ring in a biased condition. It has been found that the replacement of rings of this type is likely to be required at approximately one-third the rate of replacement parts in conventional stripping devices.

We claim:

1. A ring having an inner diameter defining a bore for close sliding engagement with a capsule forming pin, said ring having a slot extending from said bore to the outer surface of said ring and from its leading and trailing faces, and a slotted annular insert of a durable hard material positioned at the leading face of said ring and forming the leading portion of said bore, said insert slot being aligned with said ring slot.

2. A ring in accordance with claim 1 in which said slot in said ring is wider at the outer surface of said ring than at the inner surface.

3. A ring in accordance with claim 1 in which said ring has a circumferential groove through its mid-section.

4. A ring in accordance with claim 1 in which said insert is of a metalic material.

5. A ring in accordance with claim 4 in which said ring has a biased spring clip about its exterior.

* * * * *